United States Patent
Sunkara et al.

(10) Patent No.: US 9,256,391 B2
(45) Date of Patent: Feb. 9, 2016

(54) METHOD, SYSTEM, AND STORAGE MEDIA FOR GLOBAL SYNCHRONIZATION OF TIME

(75) Inventors: Chandra Sunkara, Foxboro, MA (US); Anuradha Bhat, Providence, RI (US)

(73) Assignee: GE INTELLIGENT PLATFORMS INC., Charlottesville, VA (US)

( * ) Notice: Subject to any disclaimer, the term of this patent is extended or adjusted under 35 U.S.C. 154(b) by 777 days.

(21) Appl. No.: 12/692,006

(22) Filed: Jan. 22, 2010

(65) Prior Publication Data

US 2011/0181608 A1    Jul. 28, 2011

(51) Int. Cl.
*G06F 17/40* (2006.01)
*G06F 3/14* (2006.01)
*G09G 5/393* (2006.01)

(52) U.S. Cl.
CPC .............. *G06F 3/1438* (2013.01); *G09G 5/393* (2013.01); *G09G 2370/027* (2013.01)

(58) Field of Classification Search
CPC ....................................................... G06F 17/30
USPC ........................................................ 713/400
See application file for complete search history.

(56) References Cited

U.S. PATENT DOCUMENTS

| | | | |
|---|---|---|---|
| 5,128,925 A | 7/1992 | Dornstetter et al. | |
| 6,370,159 B1 | 4/2002 | Edison | |
| 6,782,294 B2 | 8/2004 | Reich et al. | |
| 7,200,766 B2 | 4/2007 | Furhrer et al. | |
| 7,456,804 B2 | 11/2008 | Fukue | |
| 7,523,441 B2 | 4/2009 | Petersen et al. | |
| 7,593,780 B2 | 9/2009 | Mann et al. | |
| 7,627,808 B2* | 12/2009 | Blank et al. | 715/200 |
| 7,676,294 B2* | 3/2010 | Baier et al. | 700/108 |
| 7,860,857 B2* | 12/2010 | Kagan et al. | 707/710 |
| 2002/0150053 A1* | 10/2002 | Gray et al. | 370/252 |
| 2002/0194095 A1* | 12/2002 | Koren | 705/35 |

(Continued)

FOREIGN PATENT DOCUMENTS

| | | |
|---|---|---|
| CN | 101714096 A | 5/2010 |
| JP | 62136689 A | 6/1987 |

(Continued)

OTHER PUBLICATIONS

Web based multilayered distributed SCADA/HMI system in refinery application .Authors: Adnan Salihbegovic, Vlatko Marinković, Zoran Cico, Elvedin Karavdić and Nina Delic.Name and Date: ETF Sarajevo, Bosnia and Herzegovina, Bosna-S Oil Services Company, Bosnia and Herzegovina,Available online Apr. 9, 2008. (abstract provided).

(Continued)

*Primary Examiner* — Kim Huynh
*Assistant Examiner* — Eric Chang
(74) *Attorney, Agent, or Firm* — GE Global Patent Operation (57) ABSTRACT

A method for synchronizing time in a plurality of graphical displays provided within a human-machine interface (HMI) includes displaying stored data via the plurality of graphical displays, receiving data refresh configuration parameters via a configuration tool within the HMI, and storing the data refresh configuration parameters in a memory. The method also includes generating, by the HMI, a data refresh message that includes the data refresh configuration parameters, and refreshing, by at least a portion of the plurality of graphical displays, display of the stored data based on the data refresh configuration parameters.

11 Claims, 5 Drawing Sheets

(56) References Cited

U.S. PATENT DOCUMENTS

| | | |
|---|---|---|
| 2003/0009250 A1 | 1/2003 | Resnick et al. |
| 2005/0155043 A1 | 7/2005 | Schultz et al. |
| 2005/0234884 A1 | 10/2005 | Drukman et al. |
| 2007/0074121 A1 | 3/2007 | Mullender et al. |
| 2007/0150819 A1* | 6/2007 | Goodman et al. ............ 715/749 |
| 2008/0189637 A1 | 8/2008 | Krajewski et al. |
| 2008/0198868 A1 | 8/2008 | Fuehrer |
| 2009/0006488 A1* | 1/2009 | Lindahl et al. ................ 707/201 |
| 2010/0005396 A1 | 1/2010 | Nason et al. |
| 2011/0105159 A1* | 5/2011 | Hirayama .................... 455/466 |

FOREIGN PATENT DOCUMENTS

| | | |
|---|---|---|
| JP | 08212044 A | 8/1996 |
| JP | 10097506 A | 4/1998 |
| JP | 2003162408 A | 6/2003 |
| JP | 2004139305 A | 5/2004 |
| JP | 2005292677 A | 10/2005 |
| JP | 2007310777 A | 11/2007 |

OTHER PUBLICATIONS

Unofficial translation of JP office action issued Aug. 24, 2015 in regard to corresponding JP patent application 2012-550158.

PCT Search Report and Written Opinion issued in connection with corresponding PCT Application No. PCT/US2011/022084 on May 4, 2011.

Unofficial English Translation of Chinese Office Action issued in connection with corresponding CN Application No. 201180015255.X on Aug. 8, 2014.

Unofficial English Translation of Japanese Office Action issued in connection with corresponding JP Application No. 2012550158 on Jan. 6, 2015.

* cited by examiner

METHOD, SYSTEM, AND STORAGE MEDIA FOR GLOBAL SYNCHRONIZATION OF TIME

BACKGROUND

The embodiments described herein relate generally to graphical displays used to display data and, more particularly, to methods, systems, and computer-readable storage media for use in synchronizing the data displayed by such graphical displays.

At least some known systems enable a user to use a standard web browser over a network to modify a human-machine interface (HMI) and/or a control status of a machine having controllable parts such that the modifications are displayed to a remote user in real time. However, such systems do not enable specification of time synchronization parameters for use in displaying the modifications to the remote user.

Moreover, at least some known systems distribute time values to nodes within the system via a network. The distribution is synchronized by a master clock that generates a master time value and transmits the master time value to the nodes for use in synchronizing a slave clock within each node. The master clock may be a designated node or a server. Further, at least some known systems attempt to synchronize time across the system using a master clock and, if synchronization fails by the master clock, by using a reserve master clock. However, such systems do not enable specification of time synchronization parameters for use in displaying the modifications to the remote user.

BRIEF DESCRIPTION

In one aspect, a method is provided for synchronizing time in a plurality of graphical displays provided within a human-machine interface (HMI). The method includes displaying stored data via the plurality of graphical displays, receiving data refresh configuration parameters via a configuration tool within the HMI, and storing the data refresh configuration parameters in a memory. The method also includes generating, by the HMI, a data refresh message that includes the data refresh configuration parameters, and refreshing, by at least a portion of the plurality of graphical displays, display of the stored data based on the data refresh configuration parameters.

In another aspect, a system is provided that includes a server having a memory configured to store data and a client coupled to the server via a network. The client is configured to display a human-machine interface (HMI) that includes a plurality of graphical displays. The client is configured to display the stored data via the plurality of graphical displays, and receive data refresh configuration parameters via a configuration tool interface. The client is also configured to generate a data refresh message that includes the data refresh configuration parameters, and broadcast the data refresh message to the plurality of graphical displays, wherein at least a portion of the plurality of graphical displays are configured to refresh display of the stored data based on the data refresh configuration parameters.

In another aspect, one or more computer-readable storage media having a plurality of computer-executable components are provided for synchronizing time within a human-machine interface (HMI). The plurality of computer-executable components includes a plurality of graphical display components that when executed by at least one processor cause the at least one processor to display stored data, and a global time control component that causes the at least one processor to receive data refresh configuration parameters via a configuration tool within the HMI and store the data refresh configuration parameters in a memory. The global time control component also causes the at least one processor to generate a data refresh message that includes the data refresh configuration parameters, and broadcast the data refresh message to the plurality of graphical display components such that at least a portion of the plurality of graphical display components refresh display of the stored data based on the data refresh configuration parameters.

BRIEF DESCRIPTION OF THE DRAWINGS

The embodiments described herein may be better understood by referring to the following description in conjunction with the accompanying drawings.

DETAILED DESCRIPTION

Exemplary embodiments of methods, systems, and computer-readable storage media for use in synchronizing time within a plurality of graphical displays of a human-machine interface (HMI) are described herein. The embodiments described herein facilitate refreshing data displayed by a plurality of graphical displays according to data refresh configuration parameters that are automatically applied to each graphical display. Using the data refresh configuration parameters facilitates simplifying implementation of synchronization across the plurality of graphical displays without using proprietary means of a customer or site, thereby lowering development, implementation, and service costs.

Exemplary technical effects of the methods, systems, and computer-readable storage media described herein include at least one of: (a) defining data refresh configuration parameters via a global time control component and/or via computer-executable instructions, e.g., via scripting; (b) generating a data refresh message based on the data refresh configuration parameters; and (c) refreshing, such as automatically and periodically refreshing, data displayed by a plurality of graphical displays based on the data refresh message.

Figure 1:
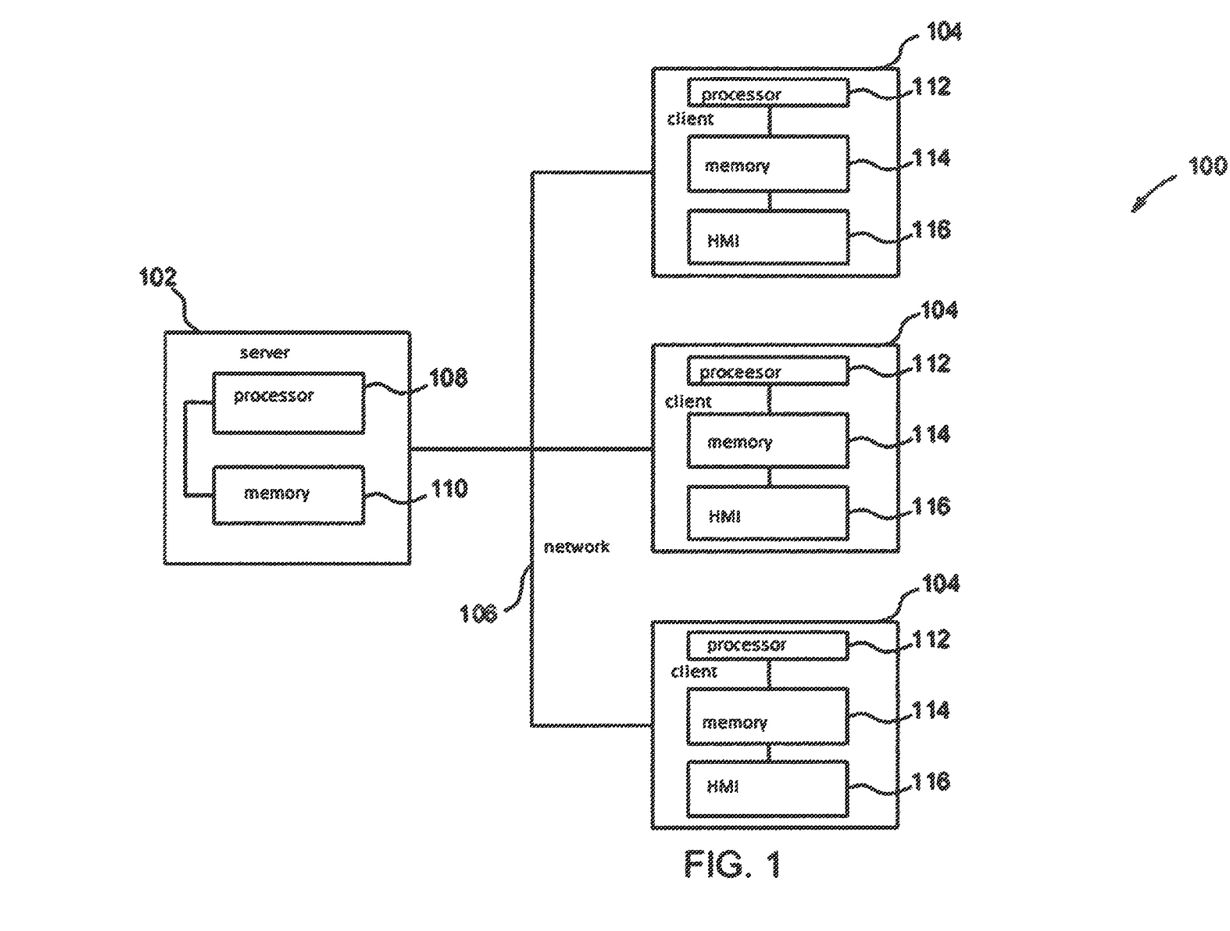
FIG. 1 is a simplified block diagram of an exemplary system.

FIG. 1 is a simplified block diagram of an exemplary system 100. In the exemplary embodiment, system 100 includes a server 102, and a plurality of client sub-systems, also referred to as clients 104, connected to server 102. In one embodiment, clients 104 are computers including a web browser and/or a client software application, such that server 102 is accessible to clients 104 over a network 106, such as the Internet and/or an intranet. Network 106 may be any suitable type of network, such as a reflective memory network, a local area network (LAN), a wide area network (WAN), dial-in-connections, cable modems, wireless modems, and/or special high-speed Integrated Services Digital Network (ISDN)

lines. As described above, clients 104 may be any device capable of interconnecting to network 106 including a computer, web-based phone, personal digital assistant (PDA), or other web-based connectable equipment.

In the exemplary embodiment, server 102 includes a processor 108 and a memory 110 coupled to processor 108. Memory 110 stores data such as automation data and/or production data. In the exemplary embodiment, memory 110 is a database that includes a timestamp for each datum that has been entered or modified within memory 110 and/or a time relating to an event corresponding to an automation operation and/or a production operation. Alternatively, memory 110 may be any suitable storage device including, but not limited to only including, optical disc drives, hard disc drives, solid state drives, or any suitable memory device for use in storing data. In one embodiment, memory 110 is accessed by potential users at one of clients 104 by logging onto server 102 through one of clients 104. In an alternative embodiment, memory 110 is stored remotely from server 102 and may be non-centralized.

In the exemplary embodiment, each client 104 includes a processor 112 and a memory 114 coupled to processor 112. Moreover, each client 104 includes a human-machine interface (HMI) 116 that communicates with processor 112 and memory 114. HMI 116 is displayed by client 104 via a display device (not shown). In some embodiments, memory 114 includes a plurality of computer-executable components, including a plurality of graphical display components and a global time control component (not shown in FIG. 1). Each component causes processor 112 to execute the operations described below.

Moreover, the embodiments illustrated and described herein as well as embodiments not specifically described herein but within the scope of aspects of the invention constitute exemplary means for use in synchronizing time within a plurality of graphical displays of a human-machine interface (HMI), and more particularly, constitute exemplary means for synchronizing data shown by a plurality of graphical displays based on a common, user-defined time period for each of the plurality of graphical displays. For example, server 102 or client 104, or any other similar computer device, may be programmed with computer-executable instructions thereby constituting exemplary means for synchronizing data shown by a plurality of graphical displays based on a common, user-defined time period for each of the plurality of graphical displays.

Figure 2:
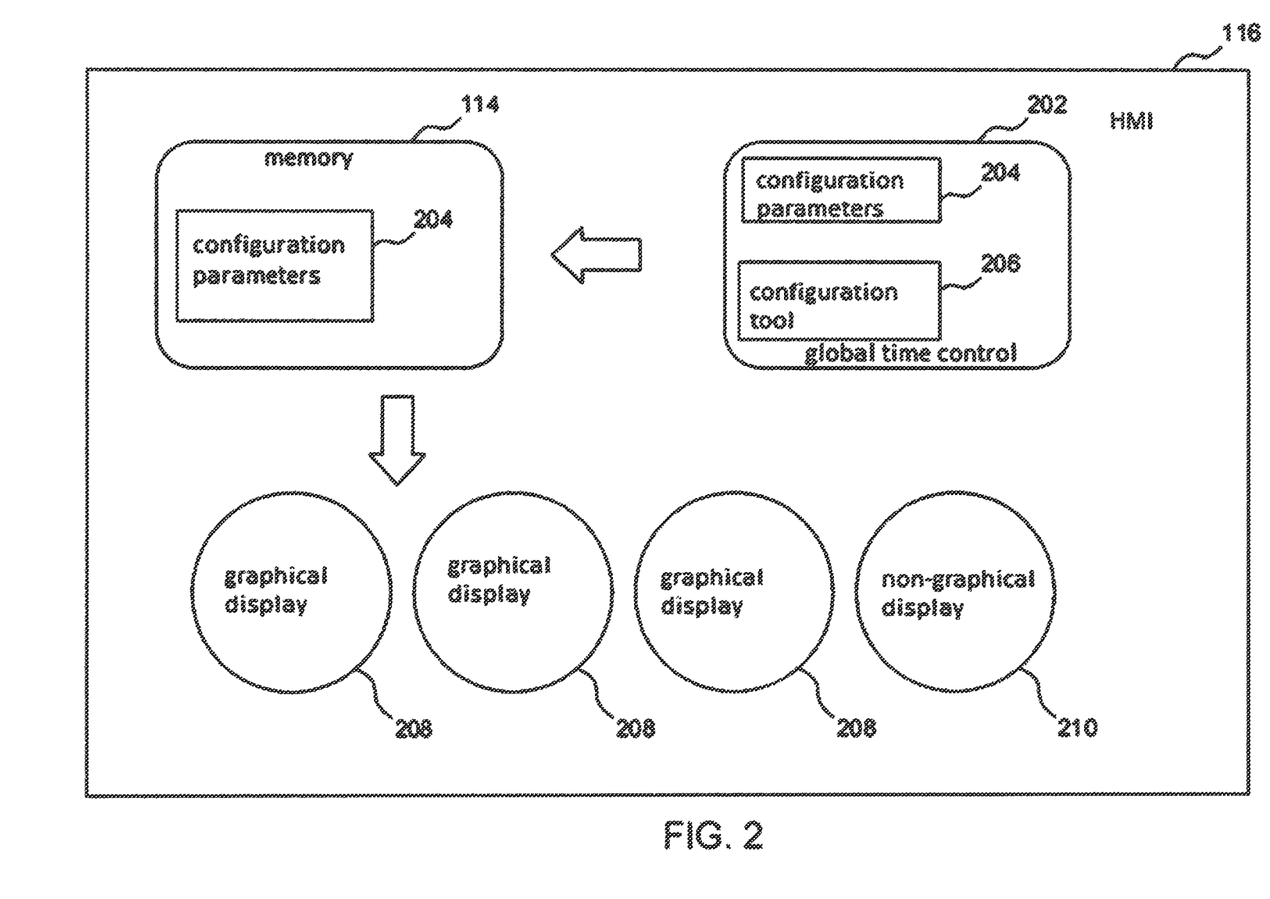
FIG. 2 is a functional block diagram of an exemplary human-machine interface (HMI) that may be used with the system shown in FIG. 1.

FIG. 2 is a functional block diagram of an exemplary HMI 116 that may be used with system 100 (shown in FIG. 1). In the exemplary embodiment, HMI 116 includes a global time control component 202 that receives data refresh configuration parameters 204 via a configuration tool 206, described in more detail below. Moreover, HMI 116 stores the data refresh configuration parameters 204 in memory 114. Specifically, HMI 116 stores the data refresh configuration parameters 204 in memory 114 after HMI 116 receives a command from a user or operator of client 104 (shown in FIG. 1). In some embodiments, HMI 116 stores a default set of data refresh configuration parameters in memory 114. Accordingly, in such embodiments, HMI 116 stores data refresh configuration parameters 204 received via global time control component 202 by overwriting the default refresh configuration parameters. Moreover, in some embodiments, HMI 116 is configured to repeatedly overwrite previously stored data refresh configuration parameters 204 within memory 114.

In the exemplary embodiment, HMI 116 also includes one or more graphical displays 208 that receive data from memory 110 via network 106, and display the data via user-viewable objects such as, but not limited to, charts and/or graphs. In some embodiments, graphical displays 208 receive the data from memory 110 only after HMI 116 receives a command from a user or operator of client 104. In an alternative embodiment, graphical displays 208 automatically receive, such as periodically, the data from memory 110. In the exemplary embodiment, graphical displays 208 receive the data from memory 110 in response to a request transmitted by client 104 to server 102 (shown in FIG. 1). Moreover, in the exemplary embodiment, graphical displays 210 refresh the data displayed via the user-viewable objects based on the data refresh configuration parameters 204. Specifically, client 104 generates a data refresh message that includes at least a portion of data refresh configuration parameters 204. HMI 116 sends the data refresh message to graphical displays 208. In response to the data refresh message, graphical displays 208 refresh the data displayed via the user-viewable objects based on data refresh configuration parameters 204 within the data refresh message.

In some embodiments, HMI 116 also includes one or more non-graphical displays 210 that receive data from memory 110 via network 106. Non-graphical displays 210 display the data or a result of manipulating the data in a different form than graphical displays 208. For example, non-graphical displays 210 may display a maximum data value or a minimum data value. Accordingly, in some embodiments, non-graphical displays 210 do not refresh the displayed data or the displayed result. However, in an alternative embodiment, non-graphical displays 210 refresh the displayed data or the displayed result based on data refresh configuration parameters 204.

Figure 3:
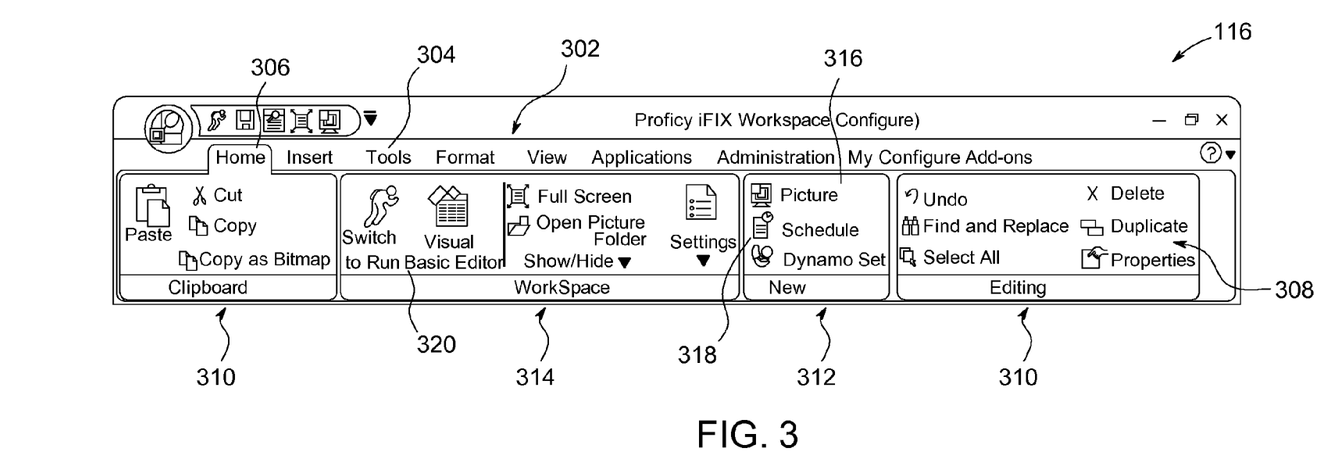
FIG. 3 is a partial screenshot of the HMI shown in FIG. 2 in a configuration mode.

FIG. 3 is a partial screenshot of HMI 116 in a configuration mode. In the exemplary embodiment, HMI 116 includes a menu bar 302 that includes a plurality of menu identifiers 304 including, for example, a home menu identifier 306. Selection of a particular menu identifier 304 by a user or an operator of client 104 (shown in FIG. 1) causes HMI 116 to display an associated ribbon bar such as, for example, a home ribbon bar 308. Home ribbon bar 308 includes a plurality of ribbon portions 310 including, for example, a New portion 312 and a WorkSpace portion 314. New portion 312 includes, for example, a new graphical display button 316 that enables the user or operator to create and configure a new graphical display 208 (shown in FIG. 2), and a new non-graphical display button 318 that enables the user or operator to create and configure a new non-graphical display 210 (shown in FIG. 2). WorkSpace portion 314 includes a switch-to-run button 320 that causes HMI 116 to switch into a run mode as described below.

Figure 4:
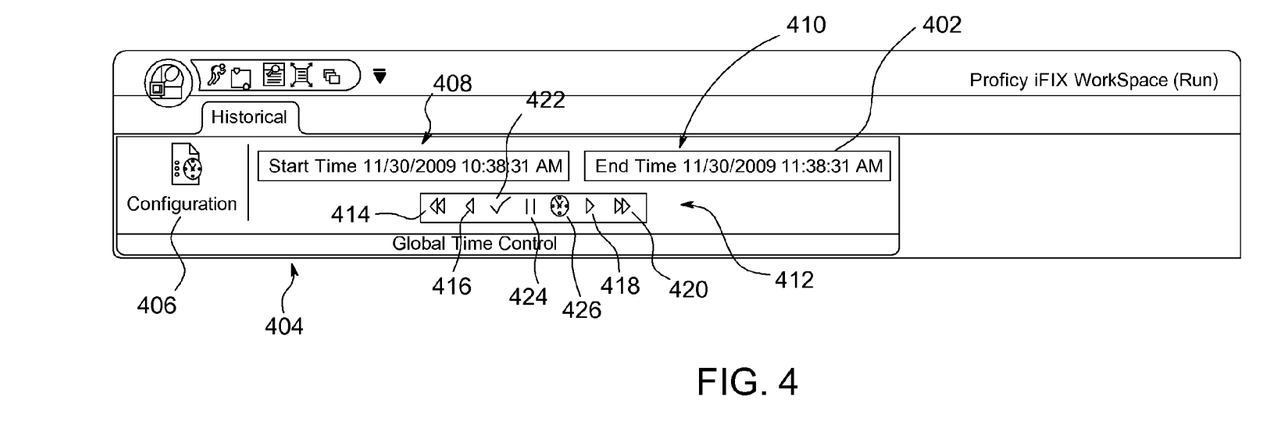
FIG. 4 is a partial screenshot of the HMI shown in FIG. 2 in a run mode.

FIG. 4 is a partial screenshot of HMI 116 in the run mode. In the exemplary embodiment, HMI 116 includes a historical ribbon bar 402 having a global time control portion 404. Global time control portion 404 includes a configuration tool button 406 that causes HMI 116 to display configuration tool 206 (shown in FIG. 2) for use in receiving data refresh configuration parameters 204 (shown in FIG. 2) as described below. Moreover, global time control portion 404 includes a start time portion 408 and an end time portion 410. A time period between a start time shown in start time portion 408 and an end time shown in end time portion 410 is a duration for which graphical displays 208 (shown in FIG. 2) receive data from memory 110 (shown in FIG. 1) for display to a user or operator or client 104 (shown in FIG. 1).

Further, in the exemplary embodiment, global time control portion 404 includes a plurality of navigation control buttons 412 including a fast reverse button 414, a slow reverse button 416, a slow forward button 418, and a fast forward button 420.

Each button 414, 416, 418, and 420 reverses or advances the data shown in graphical displays 208 by a preselected amount. In some embodiments, client 104 generates a cache of data in memory 114. Specifically, client 104 receives data from server 102, and stores the data in memory 114. When slow forward button 418 and/or fast forward button 420 are activated, the data is read from the cache in memory 114, and displayed via graphical displays 208. In the exemplary embodiment, navigation control buttons 412 also include an apply button 422 that applies data refresh configuration parameters 204 to graphical displays 208, a play/pause button 424, and a present time button 426 that inserts a present date and time into end time portion 410. Play/pause button 424, when activated, selectively pauses and plays the displayed data.

Figure 5:
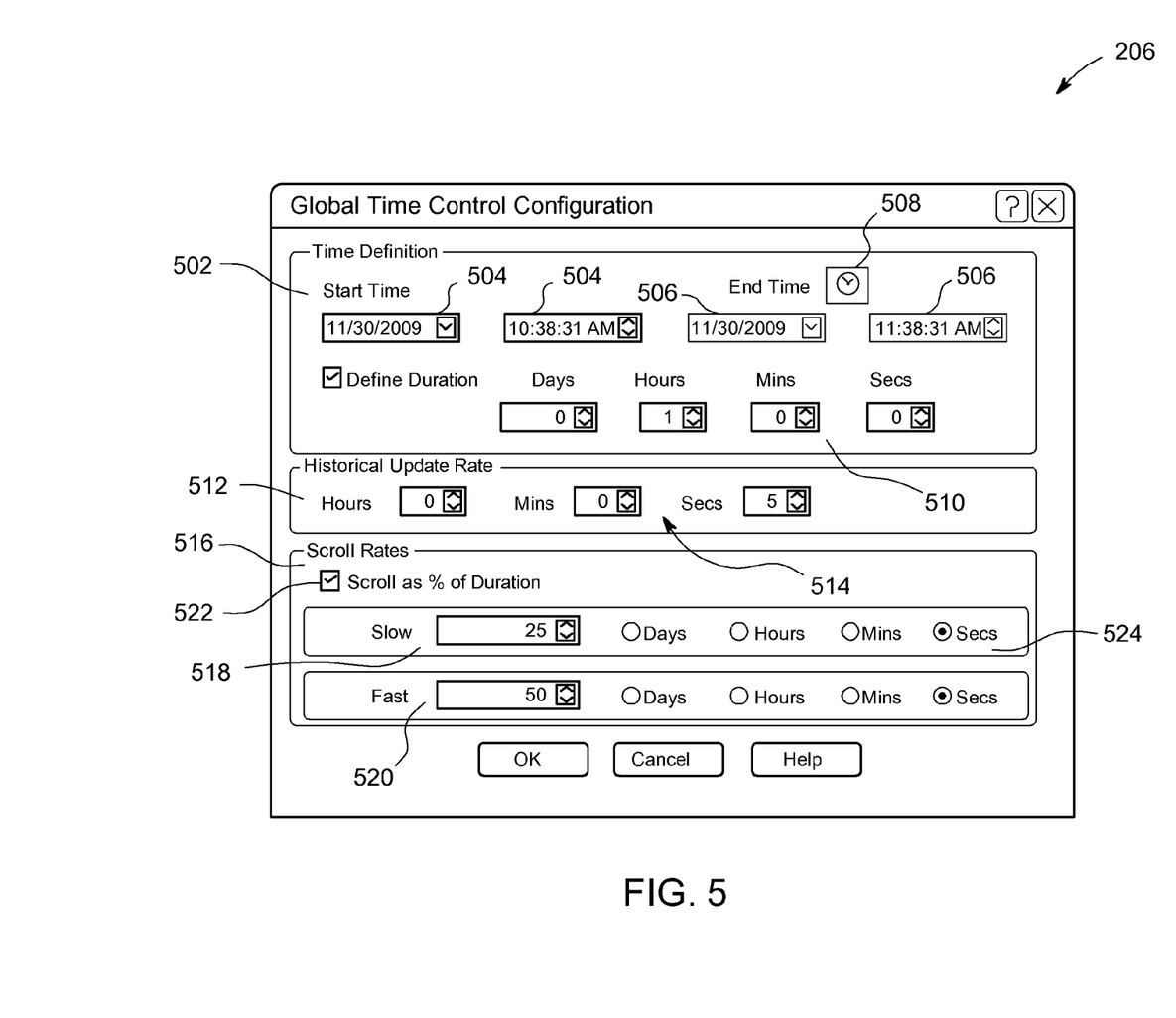
FIG. 5 is a screenshot of an exemplary configuration tool for use in receiving data refresh configuration parameters from a user or operator of the HMI shown in FIG. 2.

FIG. 5 is a screenshot of configuration tool 206 that is activated via configuration tool button 406 (shown in FIG. 4) for use in receiving data refresh configuration parameters 204 (shown in FIG. 2) from a user or operator of client 104 (shown in FIG. 1). In an alternative embodiment, data refresh configuration parameters 204 are input via a script that is executed by client 104. In another alternative embodiment, the script is executed by server 102. In the exemplary embodiment, configuration tool 206 includes a time definition portion 502 that enables the user or operator to specify a start time and either an end time or a duration of a desired time period. Specifically, time definition portion 502 includes start time fields 504 that enable the user or operator to specify the start time of the desired time period. Time definition portion 502 also includes end time fields 506 that enable the user or operator to specify the end time of the desired time period. A current time button 508 is provided that enables the user or operator to insert the current date and time into end time fields 506. Alternatively, the user or operator may specify the duration of the desired time period using duration fields 510.

In the exemplary embodiment, configuration tool 206 also includes a rate update portion 512 having rate fields 514 that enable the user or operator to specify a rate at which graphical displays 208 (shown in FIG. 2) request new or additional data from memory 110 (shown in FIG. 1).

Moreover, in the exemplary embodiment, configuration tool 206 includes a scroll rate portion 516 that enables the user or operator to specify, via a slow scroll field 518, a slow scroll rate for use with slow reverse button 416 and slow forward button 418 (both shown in FIG. 4). In addition, scroll rate portion 516 enables the user or operator to specify, via a fast scroll field 520, a fast scroll rate for use with fast reverse button 414 and fast forward button 420 (both shown in FIG. 4). Slow scroll field 518 and fast scroll field 520 are each defined as a percentage of the duration of the desired time period when a percentage designator 522 is marked. Alternatively, the user or operator may specify, via one of a plurality of radio buttons 524, the slow scroll rate and/or the fast scroll rate as an absolute value when percentage designator 522 is not marked.

Figure 6:
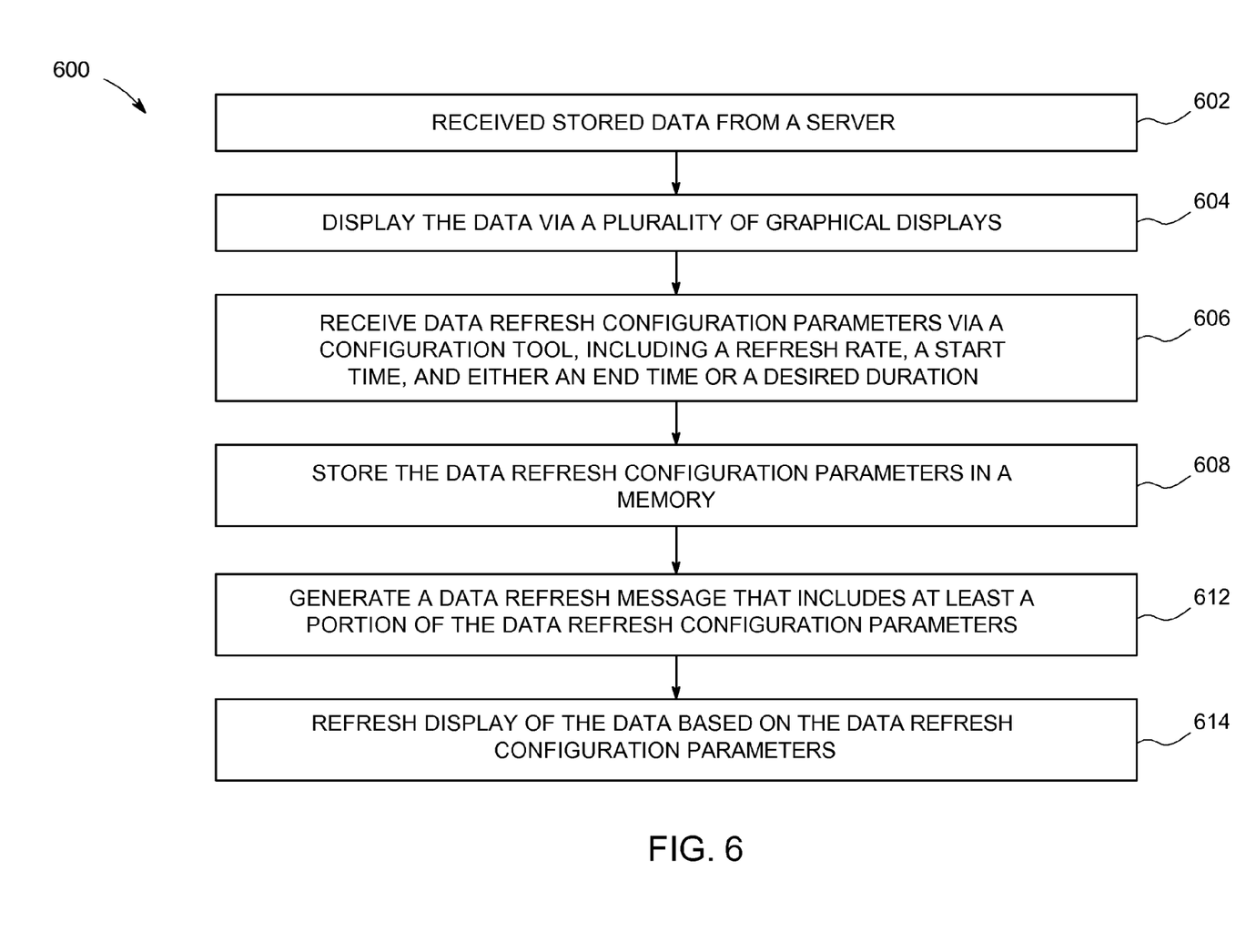
FIG. 6 is a flowchart that illustrates an exemplary method of synchronizing time within a plurality of graphical displays within the HMI shown in FIG. 2.

FIG. 6 is a flowchart 600 that illustrates an exemplary method of synchronizing time within a plurality of graphical displays, such as graphical displays 208 (shown in FIG. 2) of a human-machine interface (HMI), such as HMI 116 (shown in FIGS. 2-4).

In the exemplary embodiment, graphical displays 208 receive 602 data from memory 110 (shown in FIG. 1) via network 106 (shown in FIG. 1), and display 604 the data via user-viewable objects such as, but not limited to, charts and/or graphs. In some embodiments, graphical displays 208 receive 602 the data from memory 110 only after HMI 116 receives a command from a user or operator of client 104 (shown in FIG. 1). In an alternative embodiment, graphical displays 208 automatically receive 602, such as periodically, the data from memory 110. In the exemplary embodiment, graphical displays 208 receive 602 the data from memory 110 in response to a request transmitted by client 104 to server 102 (shown in FIG. 1).

Moreover, in the exemplary embodiment, HMI 116 receives 606 data refresh configuration parameters 204 (shown in FIG. 2). Specifically, HMI 116 includes a global time control component 202 (shown in FIG. 2) that receives 606 data refresh configuration parameters 204 via a configuration tool 206 (shown in FIG. 5). Data refresh configuration parameters 204 include a start time and either an end time or a duration of a desired time period that are each specified within time definition portion 502 (shown in FIG. 5) by a user or operator of client 104. Specifically, time definition portion 502 includes start time fields 504 (shown in FIG. 5) that enable the user or operator to specify the start time of the desired time period. Time definition portion 502 also includes end time fields 506 (shown in FIG. 5) that enable the user or operator to specify the end time of the desired time period. A current time button 508 (shown in FIG. 5) is provided that enables the user or operator to insert the current date and time into end time fields 506. Alternatively, the user or operator may specify the duration of the desired time period using duration fields 510. In the exemplary embodiment, the start time entered into start time fields 504 and the end time entered into end time fields 506 are reflected in historical ribbon bar 402 (shown in FIG. 4). Specifically, the start time and the end time are shown in start time portion 408 and in end time portion 410, respectively (both shown in FIG. 4).

In the exemplary embodiment, HMI 116 also receives 606 via global time control component 202 a rate at which graphical displays 208 request new or additional data from memory 110. The rate is specified using rate fields 514 within rate update portion 512 (both shown in FIG. 5). HMI 116 also receives 606 via global time control component 202 a slow scroll rate for use with slow reverse button 416 and slow forward button 418 (both shown in FIG. 4). Further, HMI 116 receives 606 a fast scroll rate for use with fast reverse button 414 and fast forward button 420 (both shown in FIG. 4). HMI 116 then stores 608 data refresh configuration parameters 204 in memory 114 (shown in FIG. 1). Specifically, HMI 116 stores 608 data refresh configuration parameters 204 in memory 114 after HMI 116 receives a command from a user or operator of client 104. In some embodiments, HMI 116 stores 608 data refresh configuration parameters 204 received via global time control component 202 by overwriting default refresh configuration parameters. Moreover, in some embodiments, HMI 116 is configured to repeatedly overwrite previously stored data refresh configuration parameters 204 within memory 114.

Moreover, in the exemplary embodiment, HMI 116 generates 610 a data refresh message that includes at least a portion of data refresh configuration parameters 204. HMI 116 sends the data refresh message to graphical displays 208. In response to the data refresh message, graphical displays 208 refresh 612 the data displayed via the user-viewable objects based on data refresh configuration parameters 204 within the data refresh message. Graphical displays 208 continue to refresh 612 the data displayed via the user-viewable objects based on data refresh configuration parameters 204 within the data refresh message, and at the specified refresh rate. However, graphical displays 208 stop refreshing the data displayed via the user-viewable objects at the end time of the desired time period when used in conjunction with slow forward button 418 and/or fast forward button 420.

In some embodiments, client 104 generates a cache of data in memory 114. Specifically, client 104 receives data from memory 110 and stores the data in memory 114. Upon activation of slow forward button 418 and/or fast forward button 420, the data displayed by graphical displays 208 is obtained from the cache in memory 114.

Moreover, in some embodiments, graphical displays 208 each include an independent, or default, refresh rate. In such embodiments, each graphical display 208 refreshes the data displayed via the user-viewable objects based on the default refresh rate. HMI 116 detects a timeout or other suitable event, and generates 610 a data refresh message that includes at least a portion of data refresh configuration parameters 204. HMI 116 then sends the data refresh message to graphical displays 208. In response to the data refresh message, graphical displays 208 refresh 612 the data displayed via the user-viewable objects based on data refresh configuration parameters 204 within the data refresh message.

Exemplary embodiments of methods, systems, and computer-readable storage media for use in synchronizing time within a plurality of graphical displays of a human-machine interface (HMI) are described above in detail. The methods, systems, and computer-readable storage media are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A server, computer, or client, such as those described herein, includes at least one processor or processing unit and a system memory. The server, computer, or client typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary computer system environment, embodiments of the invention are operational with numerous other general purpose or special purpose computer system environments or configurations. The computer system environment is not intended to suggest any limitation as to the scope of use or functionality of any aspect of the invention. Moreover, the computer system environment should not be interpreted as having any dependency or requirement relating to any one or combination of components illustrated in the exemplary operating environment. Examples of well known computer systems, environments, and/or configurations that may be suitable for use with aspects of the invention include, but are not limited to, programmable logic controllers (PLCs), programmable automation controllers (PACs), personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term processor.

In some embodiments, the term "database" refers generally to any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. An exemplary database is Proficy® Historian (Proficy® is a registered trademark of GE Fanuc Automation Americas, Inc., Charlottesville, Va.). Additional examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for synchronizing time in a plurality of graphical displays provided within a human-machine interface (HMI), said method comprising:
   storing automation data relating to an event corresponding to an automation operation and a timestamp associated therewith;
   displaying the stored automation data via a plurality of graphical displays;
   receiving data refresh configuration parameters via a configuration tool within a human-machine interface (HMI);
   storing the data refresh configuration parameters in a memory;
   generating, by HMI, a data refresh message that includes the data refresh configuration parameters and not the data to be refreshed;
   sending the data refresh message to each of the plurality of graphical displays; and
   refreshing, synchronously by the plurality of graphical displays, display of the stored automation data based on the data refresh configuration parameters in the data refresh message and the timestamp associated with the automation data, whereby time is synchronized on the plurality of graphical displays that were synchronously refreshed;
   wherein the data refresh configuration parameters include a data refresh rate, a start time of a desired time period, and one of an end time of the desired time period or a duration of the desired time period, wherein each of the plurality of graphical displays is synchronized to the start time, and one of the end time of the desired time period or the duration of the desired time period.

2. A method in accordance with claim 1, further comprising receiving the stored automation data, by the HMI, from a server via a network.

3. A method in accordance with claim 1, further comprising:
   receiving navigation commands via at least one navigation control button; and
   refreshing, by at least a portion of the plurality of graphical displays, display of the stored automation data based on the data refresh configuration parameters and the navigation commands.

4. A system comprising:
   a server comprising a memory configured to store automation data and an associated timestamp; and
   a client coupled to said server via a network, said client configured to display a human-machine interface (HMI) comprising a plurality of graphical displays, said client configured to:
   display the stored automation data via said plurality of graphical displays;
   receive data refresh configuration parameters via a configuration tool interface;
   generate a data refresh message that includes the data refresh configuration parameters;
   broadcast the data refresh message to said plurality of graphical displays, the graphical displays configured to synchronously refresh display of the stored automation data based on the data refresh configuration parameters, and the timestamp associated with the automation data;
   wherein the data refresh configuration parameters include a data refresh rate, a start time of a desired time period, and one of an end time of the desired time period or a duration of the desired time period, wherein each of the plurality of graphical displays is synchronized to the start time, and one of the end time of the desired time period or the duration of the desired time period.

5. A system in accordance with claim 4, wherein the data refresh configuration parameters include a scroll rate.

6. A system in accordance with claim 4, wherein said client further comprises a memory, said HMI is further configured to save the data refresh configuration parameters in said memory.

7. A system in accordance with claim 4, wherein said client is configured to selectively one of refresh display of the stored data based on the data refresh message and ignore the data refresh message.

8. A system in accordance with claim 4, wherein said HMI further comprises a global time control display comprising a plurality of navigation control buttons, said client is further configured to selectively advance the display of the stored data and reverse the display of the stored data.

9. A non-transitory machine-readable storage medium having a plurality of computer-executable components for synchronizing time within a human-machine interface (HMI), said plurality of computer-executable components comprising:
   a plurality of graphical display components that when executed by at least one processor cause the at least one processor to display stored automation data; and
   a global time control component that when executed by the at least one processor causes the at least one processor to:
   receive data refresh configuration parameters via a configuration tool within the HMI;
   store the data refresh configuration parameters in a memory;
   generate a data refresh message that includes the data refresh configuration parameters; and
   broadcast the data refresh message to the plurality of graphical displays components such that the plurality of graphical display components synchronously refresh display of the stored automation data based on the data refresh configuration parameters and the timestamp associated with the automation data;
   wherein the data refresh configuration parameters include a data refresh rate, a start time of a desired time period, and one of an end time of the desired time period or a duration of the desired time period, wherein each of the plurality of graphical displays is synchronized to the start time, and one of the end time of the desired time period or the duration of the desired time period.

10. A non-transitory machine-readable storage medium in accordance with claim 9, wherein the plurality of graphical display components receive the stored automation data from a server via a network.

11. A non-transitory machine-readable storage medium in accordance with claim 9, wherein the global time control component:
    receives navigation commands via at least one navigation control button; and
    broadcasts the data refresh message to the plurality of graphical displays components such that at least a portion of the plurality of graphical display components refresh display of the stored automation data based on the data refresh configuration parameters and the navigation commands.

* * * * *